(12) United States Patent
Snyder

(10) Patent No.: US 6,957,242 B1
(45) Date of Patent: Oct. 18, 2005

(54) NONINTERFERING MULTIPLY-MAC (MULTIPLY ACCUMULATE) CIRCUIT

(75) Inventor: Warren Snyder, Snohomish, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 654 days.

(21) Appl. No.: 09/923,461

(22) Filed: Aug. 6, 2001

Related U.S. Application Data

(60) Provisional application No. 60/243,708, filed on Oct. 26, 2000.

(51) Int. Cl.[7] .............................................. G06F 7/38
(52) U.S. Cl. ..................................... 708/490; 708/523
(58) Field of Search ................................. 708/490, 523

(56) References Cited

U.S. PATENT DOCUMENTS

| | | | |
|---|---|---|---|
| 5,179,531 A * | 1/1993 | Yamaki | 708/490 |
| 5,202,687 A | 4/1993 | Distinti | 341/158 |
| 5,241,492 A * | 8/1993 | Girardeau, Jr. | 708/523 |
| 6,144,327 A | 11/2000 | Distinti et al. | 341/126 |
| 6,269,383 B1 * | 7/2001 | Sabin et al. | 708/490 |
| 6,421,698 B1 * | 7/2002 | Hong | 708/490 |
| 6,483,343 B1 * | 11/2002 | Faith et al. | 708/523 |
| 6,611,856 B1 * | 8/2003 | Liao et al. | 708/523 |

* cited by examiner

Primary Examiner—Tan V. Mai
(74) Attorney, Agent, or Firm—Wagner, Murabito & Hao LLP

(57) ABSTRACT

A noninterfering multiply-MAC (multiply accumulate) circuit is described. The circuit is operational to perform a MAC (multiply accumulate) operation and to perform a multiply operation without interfering with the accumulate value of the MAC operation. The circuit includes a first register, a second register, a multiplier circuit, and an accumulate circuit. The first register is addressable using either a primary first address or an alias first address. Moreover, the second register is addressable using either a primary second address or an alias second address. The multiplier circuit performs a multiply operation to generate a product value based on the data in the first and second registers after a write operation to either the first register or the second register. The accumulate circuit performs an accumulate operation to generate an accumulate value if either the alias first address or the alias second address is used in the write operation.

23 Claims, 3 Drawing Sheets

| TYPE OF WRITE OPERATION | OPERATION PERFORMED BY CIRCUIT |
|---|---|
| WRITE OPERATION USING X ADDRESS | MULTIPLY |
| WRITE OPERATION USING X' ADDRESS | MAC |
| WRITE OPERATION USING Y ADDRESS | MULTIPLY |
| WRITE OPERATION USING Y' ADDRESS | MAC |

FIGURE 2

NONINTERFERING MULTIPLY-MAC (MULTIPLY ACCUMULATE) CIRCUIT

RELATED U.S. APPLICATION

This application claims priority to and the benefit of the copending provisional patent application, Ser. No. 60/243,708, entitled "Advanced Programmable Microcontroller Device," with filing date Oct. 26, 2000, and assigned to the assignee of the present application.

BACKGROUND OF THE INVENTION

1. Field of the Invention

The present invention generally relates to digital circuits. More particularly, the present invention relates to the field of circuits that provide a MAC (multiply accumulate) operation and provide a multiply operation without interfering with an accumulate value of the MAC operation.

2. Related Art

Microcontrollers (or controllers) have been utilized in various applications for many years. Primarily, microcontrollers are used in control-oriented applications that are interrupt-driven, sensing and controlling external events. Microcontrollers are frequently found in: appliances (e.g., microwave oven, refrigerator, television, VCR, stereo), computers and computer equipment (e.g., laser printers, modems, disk drives), automobiles (e.g., engine control, diagnostics, climate control), environmental control (e.g., greenhouse, factory, home), aerospace, and thousands of other uses.

The technology environment for digital signal processing (DSP) is rapidly changing. DSP performance continues to increase at a fairly constant rate across the industry, and the complexity of peripherals is also expanding. The performance goal of a DSP architecture is to perform as many arithmetic operations as possible in the smallest number of clock cycles. But whereas DSP-centric applications have traditionally employed processors designed for DSP tasks, a complementary, and competing, technology has emerged. Microcontroller suppliers are offering DSP-specific functionality to their architectures. Some of these microcontrollers have a MAC (multiply accumulate) circuit. The MAC operation is a very common operation in (DSP) algorithms.

In a conventional MAC circuit, a multiply operation is performed to generate a product value. Then, an accumulate operation is performed to generate an accumulate value based on the product value and a previous accumulate value. Typically, the conventional MAC circuit is unable to perform the multiply operation and disable the accumulate operation to avoid disturbing or interfering with the previous accumulate value.

SUMMARY OF THE INVENTION

A noninterfering multiply-MAC (multiply accumulate) circuit is described. The circuit can be incorporated in microcontroller (or controller) or DSP designs. The circuit is operational to perform a MAC (multiply accumulate) operation and to perform a multiply operation without interfering with the accumulate value of the MAC operation.

In an embodiment, the noninterfering multiply-MAC circuit includes a first register, a second register, a multiplier circuit, and an accumulate circuit. The first register is addressable using a primary first address. Also, the first register is addressable using an alias first address. Moreover, the second register is addressable using a primary second address. Also, the second register is addressable using an alias second address. In an embodiment, the multiplier circuit performs a multiply operation to generate a product value based on the data in the first and second registers after a write operation to either the first register or the second register or either of their aliases. The accumulate circuit performs an accumulate operation to generate an accumulate value based on the product value and a previous accumulate value if either the alias first address or the alias second address is used in the write operation. Thus, the multiplier circuit can operate independently from the accumulator circuit.

These and other advantages of the present invention will no doubt become apparent to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 2 illustrates a table showing the operations performed by the circuit of FIG. 1 based on the register address used in a write operation in accordance with an embodiment of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
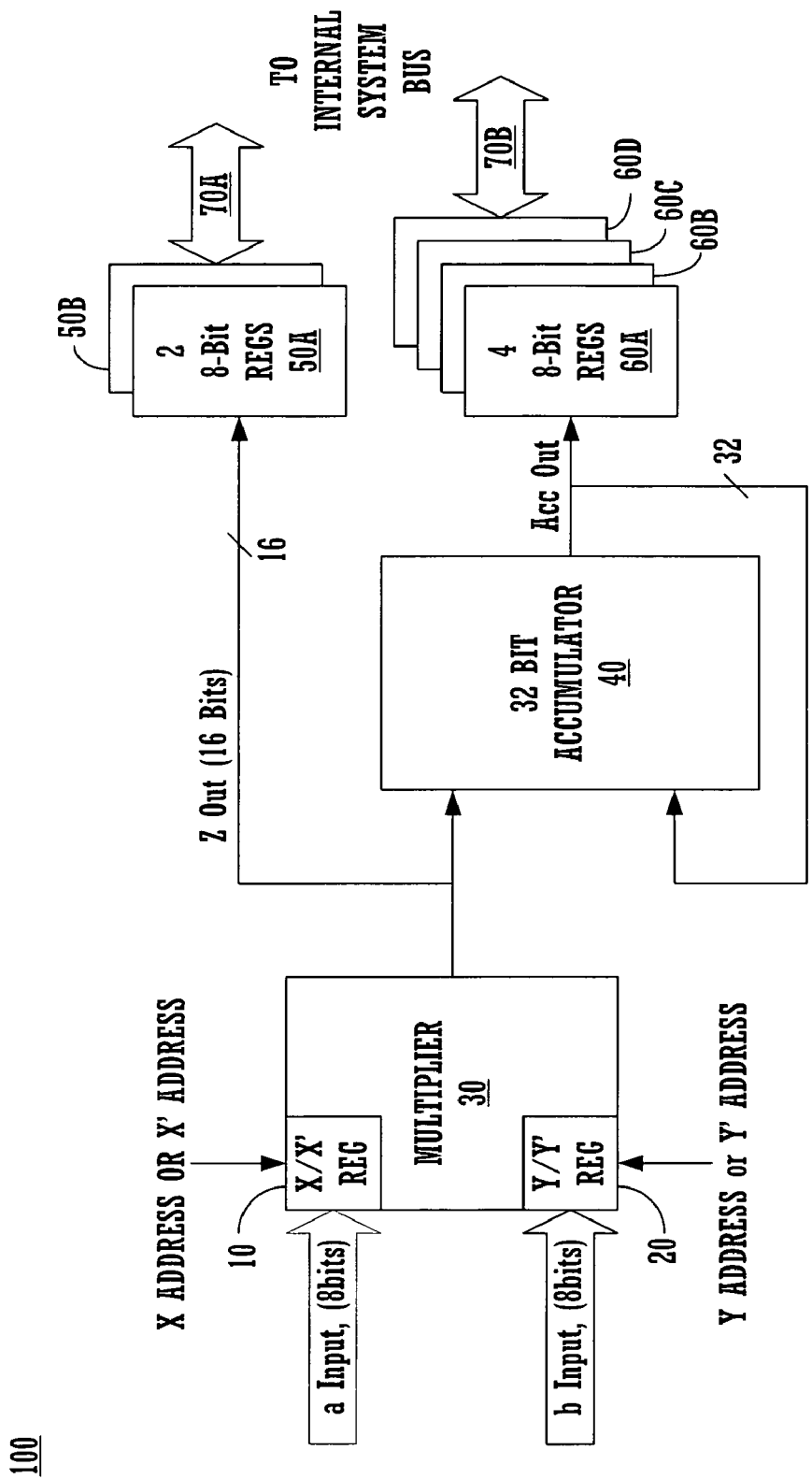
FIG. 1 illustrates a noninterfering multiply-MAC circuit in accordance with an embodiment of the present invention.

FIG. 1 illustrates a noninterfering multiply-MAC circuit 100 in accordance with an embodiment of the present invention. The circuit 100 can be incorporated in microcontroller (or controller) or DSP designs. The circuit 100 is operational to perform a MAC (multiply accumulate) operation and to perform a multiply operation without interfering with the accumulate value of the MAC operation. It should be understood that the circuit 100 could have other configurations.

In an embodiment, the noninterfering multiply-MAC circuit 100 includes a first register 10, a second register 20, a multiplier circuit 30, and an accumulate circuit 40. The first register 10 (e.g., X/X' register 10) is addressable using a primary first address (e.g., X address), whereas the primary first address indicates the multiply operation is selected and disables the accumulate operation performed by the accumulate circuit 40. Also, the first register 10 is addressable using an alias first address (e.g., X' address), whereas the alias first address indicates the MAC operation is selected and enables the multiply operation performed by the multiplier circuit 30 and the accumulate operation performed by the accumulate circuit 40. Either the X address or the X' address is used to write the first data a into the X/X' register 10, whereas the first data a can be 8 bits long or any other length.

Moreover, the second register 20 (e.g., Y/Y' register 20) is addressable using a primary second address (e.g., Y address), whereas the primary second address indicates the multiply operation is selected and disables the accumulate operation performed by the accumulate circuit 40. Also, the second register 20 is addressable using an alias second address (e.g., Y' address), whereas the alias second address indicates the MAC operation is selected and enables the multiply operation performed by the multiplier circuit 30 and the accumulate operation performed by the accumulate circuit 40. Either the Y address or the Y' address is used to write the second data b into the Y/Y' register 20, whereas the second data b can be 8 bits long or any other length.

For example, the X address can be E8 and the Y address can be E9. Moreover, the X' address can be EA and the Y' address can be EB. More importantly, the register address (e.g., X address, X' address, Y address, or Y' address) used in the write operation to either the X/X' register 10 or the Y/Y' register 20 determines whether a multiply operation or a MAC operation is performed by the circuit 100.

In an embodiment, the multiplier circuit 30 is coupled to the X/X' register 10 and the Y/Y' register 20. The multiplier circuit 30 is operative to perform the multiply operation to generate a product value $Z_{out}$ based on the data in the X/X' register 10 and the Y/Y' register 20 after a write operation is performed on either the X/X' register 10 or the Y/Y' register 20. The product value $Z_{out}$ can be 16 bits long or a different length. The product value $Z_{out}$ can be stored in the 8-bit register 50A and the 8-bit register 50B, whereas the 8-bit registers 50A and 50B can interface via connection 70A to the internal system bus in a microcontroller, a DSP, etc.

In an embodiment, the accumulate circuit 40 is coupled to the multiplier circuit 30. In an embodiment, the accumulate circuit 40 checks or records the register address (e.g., X address, X' address, Y address, or Y' address) used in the write operation performed on either the X/X' register 10 or the Y/Y' register 20. The accumulate circuit 40 is operative to perform an accumulate operation to generate an accumulate value $acc_{out}$ based on the product value $Z_{out}$ and a previous accumulate value if either the X' address or the Y' address is used in the write operation performed on either the X/X' register 10 or the Y/Y' register 20. If either the X address or the Y address is used in the write operation performed on either the X/X' register 10 or the Y/Y' register 20, the accumulate circuit 40 does not perform the accumulate operation and does not change the previous accumulate value. The accumulate value $acc_{out}$ can be 32 bits long or a different length. The accumulate value $acc_{out}$ can be stored in the 8-bit registers 60A, 60B, 60C, and 60D, whereas the 8-bit registers 60A, 60B, 60C, and 60D can interface via connection 70B to the internal system bus in a microcontroller, a DSP, etc.

One advantageous feature of the circuit 100 is that the multiplier circuit 30 can operate independently from the accumulator circuit 40. For example, if the circuit 100 performs several MAC operations for a DSP algorithm to generate a particular accumulate value $acc_{out}$, the DSP algorithm can be suspended so that circuit 100 can perform a multiply operation without disturbing, changing, or interfering with the particular accumulate value $acc_{out}$. After performing the multiply operation, the circuit 100 can resume performing MAC operations for the DSP algorithm.

FIG. 2 illustrates a table 200 showing the operations performed by the circuit 100 of FIG. 1 based on the register address (e.g., X address, X' address, Y address, or Y' address) used in a write operation in accordance with an embodiment of the present invention. The entry 230A indicates that after a write operation is performed on the X/X' register 10 using the X address, the noninterfering multiply-MAC circuit 100 performs a multiply operation based on the data in the X/X' register 10 and the Y/Y' register 20. The entry 230B indicates that after a write operation is performed on the X/X' register 10 using the X' address, the noninterfering multiply-MAC circuit 100 performs a MAC operation based on the data in the X/X' register 10 and the Y/Y' register 20. The entry 230C indicates that after a write operation is performed on the Y/Y' register 20 using the Y address, the noninterfering multiply-MAC circuit 100 performs a multiply operation based on the data in the X/X' register 10 and the Y/Y' register 20. The entry 230D indicates that after a write operation is performed on the Y/Y' register 20 using the Y' address, the noninterfering multiply-MAC circuit 100 performs a MAC operation based on the data in the X/X' register 10 and the Y/Y' register 20.

For example, the product value of the first data a and the second data b can be generated in several ways. In a first case, a first write operation is performed on the X/X' register 10 using the X address to load the first data a. The circuit 100 performs a multiply operation to generate a first product value using the first data a and the data stored in the Y/Y' register 20. Next, a second write operation is performed on the Y/Y' register 20 using the Y address to load the second data b. The circuit 100 performs a multiply operation to generate a second product value using the first data a and the second data b. In a second case, a first write operation is performed on the Y/Y' register 20 using the Y address to load the second data b. The circuit 100 performs a multiply operation to generate a first product value using the second data b and the data stored in the X/X' register 10. Next, a second write operation is performed on the X/X' register 10 using the X address to load the first data a. The circuit 100 performs a multiply operation to generate a second product value using the first data a and the second data b.

A MAC operation based on the first data a and the second data b can be generated in several ways. In a first case, a first write operation is performed on the X/X' register 10 using the X address to load the first data a. The circuit 100 performs a multiply operation to generate a first product value using the first data a and the data stored in the Y/Y' register 20. Next, a second write operation is performed on the Y/Y' register 20 using the Y' address to load the second data b. The circuit 100 performs a MAC operation to generate an accumulate value based on the first data a, the second data b, and a previous accumulate value. In a second case, a first write operation is performed on the Y/Y' register 20 using the Y address to load the second data b. The circuit 100 performs a multiply operation to generate a first product value using the second data b and the data stored in the X/X' register 10. Next, a second write operation is performed on the X/X' register 10 using the X' address to load the first data a. The circuit 100 performs a MAC operation to generate an accumulate value based on the first data a, the second data b, and a previous accumulate value.

Figure 3:
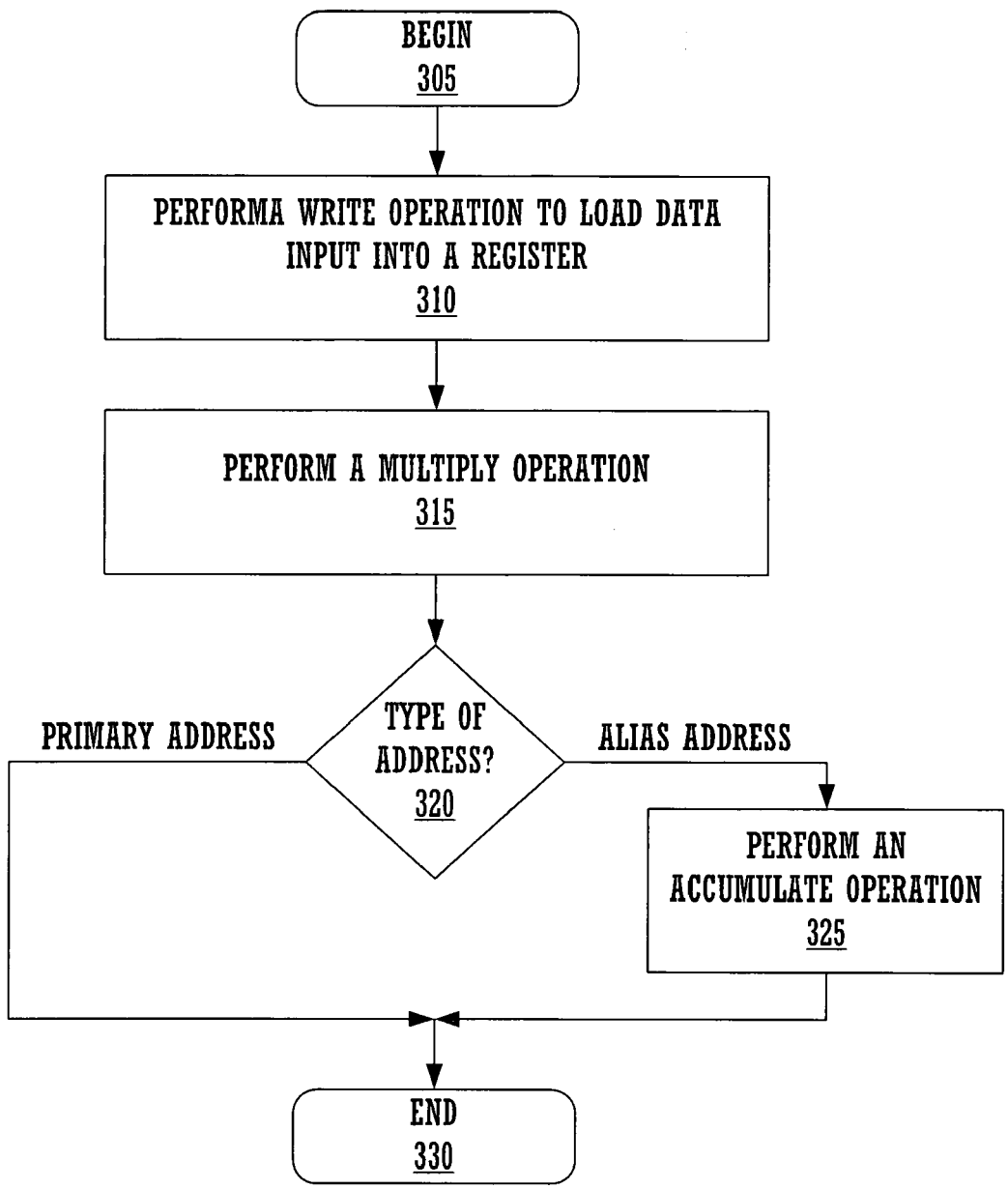
FIG. 3 illustrates a flow chart showing a method of selectively performing a multiply operation and a MAC (multiply accumulate) operation in accordance with an embodiment of the present invention.

FIG. 3 illustrates a flow chart showing a method 300 of selectively performing a multiply operation and a MAC (multiply accumulate) operation in accordance with an embodiment of the present invention. Reference is made to FIG. 1.

At step 305, the method 300 of selectively performing a multiply operation and a MAC (multiply accumulate) operation in accordance with an embodiment of the present invention begins.

Furthermore, at step 310, a write operation is performed to load the data input (e.g., data a or data b) into a register (e.g., the X/X' register 10 or the Y/Y' register 20).

Moreover, at step 315, the multiplier circuit 30 performs a multiply operation to generate a product value using the data stored in the X/X' register 10 and the Y/Y' register 20.

Continuing at step 320, the accumulator circuit 40 determines whether the primary address (e.g., X address or Y address) or the alias address (e.g., X' address or Y' address) was used to write to the register (e.g., the X/X' register 10 or the Y/Y' register 20). If the primary address (e.g., X address or Y address) was used to write to the register (e.g., the X/X' register 10 or the Y/Y' register 20), the method 300 proceeds to step 330. If the alias address (e.g., X' address or Y' address) was used to write to the register (e.g., the X/X' register 10 or the Y/Y' register 20), the method 300 proceeds to step 325.

At step 325, the accumulator circuit 40 performs an accumulate operation to generate an accumulate value based on the product value and a previous accumulate value. Moreover, at step 330, the method 300 ends.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A circuit for selecting a multiply operation or a MAC (multiply accumulate) operation comprising:
   a first register operative to store a first data, wherein said first register is addressable using a first address which enables said multiply operation and disables an accumulate operation and is addressable using a second address which enables a MAC operation; and
   a second register operative to store a second data, wherein said second register is addressable using a third address which enables said multiply operation and disables said accumulate operation and is addressable using a fourth address which enables said MAC operation.

2. A circuit as recited in claim 1 further comprising:
   a multiplier circuit coupled to said first and second registers, wherein said multiplier circuit is operative to perform said multiply operation to generate a product value based on data in said first and second registers after a write operation is performed on any one of said first and second registers; and
   an accumulator circuit coupled to said multiplier circuit, wherein said accumulator circuit is operative to perform said accumulate operation to generate an accumulate value based on said product value and a previous accumulate value if any one of said second and fourth addresses is used in said write operation.

3. A circuit as recited in claim 2 wherein if any one of said first and third addresses is used in said write operation, said previous accumulate value is not changed.

4. A circuit as recited in claim 1 wherein said first address is a primary address and wherein said second address is an alias address.

5. A circuit as recited in claim 1 wherein said third address is a primary address and wherein said fourth address is an alias address.

6. A circuit for selectively performing a multiply operation and a MAC (multiply accumulate) operation, comprising:
   a first register operative to store a first data, wherein said first register is addressable using a first address which indicates said multiply operation is selected and is addressable using a second address which indicates said MAC operation is selected;
   a second register operative to store a second data, wherein said second register is addressable using a third address which indicates said multiply operation is selected and is addressable using a fourth address which indicates said MAC operation is selected;
   a multiplier circuit coupled to said first and second registers, wherein said multiplier circuit is operative to perform said multiply operation to generate a product value based on data in said first and second registers after a write operation is performed on any one of said first and second registers; and
   an accumulator circuit coupled to said multiplier circuit, wherein said accumulator circuit is operative to perform an accumulate operation to generate an accumulate value based on said product value and a previous accumulate value if any one of said second and fourth addresses is used in said write operation.

7. A circuit as recited in claim 6 wherein said first address is a primary address and wherein said second address is an alias address.

8. A circuit as recited in claim 6 wherein said third address is a primary address and wherein said fourth address is an alias address.

9. A circuit as recited in claim 6 wherein if any one of said first and third addresses is used in said write operation, said previous accumulate value is not changed.

10. A circuit as recited in claim 6 wherein after a first MAC operation is performed and before a second MAC operation is performed, a first multiply operation is performed without changing a first accumulate value associated with said first MAC operation.

11. A controller comprising:
   a first register operative to store a first data, wherein said first register is addressable using a first address which indicates a multiply operation is selected and is addressable using a second address which indicates a MAC (multiply accumulate) operation is selected;
   a second register operative to store a second data, wherein said second register is addressable using a third address which indicates said multiply operation is selected and is addressable using a fourth address which indicates said MAC operation is selected;

a multiplier circuit coupled to said first and second registers, wherein said multiplier circuit is operative to perform said multiply operation to generate a product value based on data in said first and second registers after a write operation is performed on any one of said first and second registers; and an accumulator circuit coupled to said multiplier circuit, wherein said accumulator circuit is operative to perform an accumulate operation to generate an accumulate value based on said product value and a previous accumulate value if any one of said second and fourth addresses is used in said write operation.

12. A controller as recited in claim 11 wherein said first address is a primary address and wherein said second address is an alias address.

13. A controller as recited in claim 11 wherein said third address is a primary address and wherein said fourth address is an alias address.

14. A controller as recited in claim 11 wherein if any one of said first and third addresses is used in said write operation, said previous accumulate value is not changed.

15. A controller as recited in claim 11 wherein after a first MAC operation is performed and before a second MAC operation is performed, a first multiply operation is performed without changing a first accumulate value associated with said first MAC operation.

16. A controller comprising:

a first register operative to store a first data, wherein said first register is addressable using a first address which disables an accumulate operation and is addressable using a second address which enables said accumulate operation; and a second register operative to store a second data, wherein said second register is addressable using a third address which disables said accumulate operation and is addressable using a fourth address which enables said accumulate operation.

17. A controller as recited in claim 16 further comprising:

a multiplier circuit coupled to said first and second registers, wherein said multiplier circuit is operative to perform a multiply operation to generate a product value based on data in said first and second registers after a write operation is performed on any one of said first and second registers; and an accumulator circuit coupled to said multiplier circuit, wherein said accumulator circuit is operative to perform said accumulate operation to generate an accumulate value based on said product value and a previous accumulate value if any one of said second and fourth addresses is used in said write operation.

18. A controller as recited in claim 17 wherein if any one of said first and third addresses is used in said write operation, said previous accumulate value is not changed.

19. A controller as recited in claim 16 wherein said first address is a primary address and wherein said second address is an alias address.

20. A controller as recited in claim 16 wherein said third address is a primary address and wherein said fourth address is an alias address.

21. A method of selectively performing a multiply operation and a MAC (multiply accumulate) operation, comprising the steps of:

a) writing a first data to a first register using one of a first address which indicates said multiply operation is selected and a second address which indicates said MAC operation is selected;

b) performing said multiply operation using said first data and a second data stored in a second register to generate a product value; and c) performing an accumulate operation to generate an accumulate value based on said product value and a previous accumulate value if said second address is used in said step a).

22. A method as recited in claim 21 wherein said first address is a primary address and wherein said second address is an alias address.

23. A method as recited in claim 21 wherein if said first address is used in said step a), said previous accumulate value is not changed.

* * * * *